No. 893,952. PATENTED JULY 21, 1908.
D. L. TSCHANTZ.
ROLLER BEARING.
APPLICATION FILED NOV. 27, 1907.
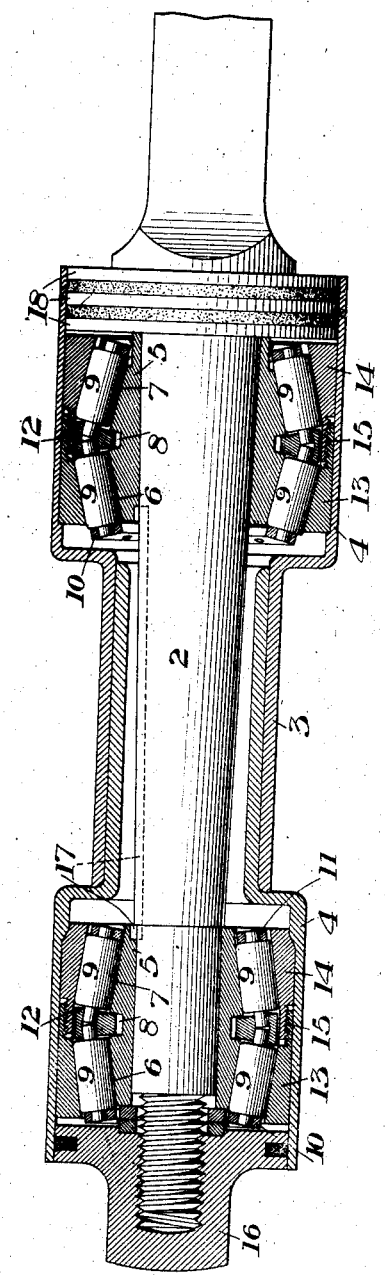
WITNESSES
INVENTOR

UNITED STATES PATENT OFFICE.

DAVID L. TSCHANTZ, OF CANTON, OHIO.

ROLLER-BEARING.

No. 893,952.          Specification of Letters Patent.          Patented July 21, 1908.

Application filed November 27, 1907. Serial No. 404,176.

*To all whom it may concern:*

Be it known that I, DAVID L. TSCHANTZ, of Canton, Stark county, Ohio, have invented a new and useful Roller-Bearing, of which the following is a full, clear, and exact description, reference being had to the accompanying drawings, forming part of this specification, in which the figure is a longitudinal section of a roller-bearing device embodying my invention.

My invention has relation to the class of roller bearings, and is designed to provide an improved bearing device of this character, in which the parts subject to wear are capable of being readily removed, and in which provision is made for adjustment to compensate for wear.

The present application is an improvement upon the roller bearing described and claimed in my pending application, Serial No. 387,612, filed August 8th, 1907.

The precise nature of the improvement will be best understood by reference to the accompanying drawing, in which I have shown the preferred form of my invention, it being premised, however, that various changes may be made in the details of construction and arrangement without departing from the spirit and scope of my invention.

In the drawing, in which I have shown my bearing as applied to a vehicle wheel and axle, the numeral 2 designates the axle, and 3 the wheel-hub or casing. This hub is formed with the enlarged portions 4 at each end, which form the chambers for the bearings. Each of these bearings consists of a sleeve member 5, which is placed around the axle, and which is formed with an outer double-coned surface, 6 and 7, the two surfaces being inclined at an angle to each other, forming in effect two cones placed base to base but partially separated by a circumferential groove 8.

9 designates the rollers, which are arranged in two sets, one set bearing against each of the cone faces. These rollers are mounted in a cage, consisting of the two end rings 10 and 11, and the central ring 12. The gudgeons or journals at the inner ends of the two series of rollers are both mounted in the central ring 12 of the roller cage, and are abutted end to end therein so that the end thrust on any one roller of one set is communicated directly to the adjacent roller in the other set, thus holding the end faces of the rollers out of contact with the sides of the ring 12 and preventing friction against such ring. The member 12 is preferably of wedge form and engages the groove 8.

13 and 14 designate two cup members of the bearing. These are each formed at their inner ends with a threaded extension 15, these two extensions being engaged with each other. The inner face of each cup member provides a bearing surface which is substantially parallel with the corresponding cone surface of the sleeve.

16 represents the usual nut, which is screwed upon the threaded end of the axle, and which closes the outer end of the casing. The two cone-sleeves are shown as held at the proper distance apart by a key 17 which is seated in the axle. When the nut 16 is screwed up, the outer cone-sleeve is forced back against the key, and all endwise play of the cones prevented together with rotation thereof. The inner cone-sleeve seats back against the collar 18.

In the drawing, I have shown the outer bearing casing 4 as formed in a separate piece telescopically fitted within the central portion of the hub 3. The bearings can be readily removed from the bearing casing for renewal or repairs. The threaded connection of the cup-members of each bearing permits said members to be readily and easily adjusted to take up any wear which may occur. The entire bearing is simple in its construction, and is extremely efficient in its operation.

While I have shown my improved bearing as used for a wheel bearing, it is obvious that it is adapted to a large variety of uses, it being immaterial to the action of the bearing whether the casing member 3 is the rotating member, or whether such casing is stationary and the part corresponding to the axle is the rotating member, since the bearing will work equally well in either case.

It will be noted that there is no wear whatever either upon the axle or upon the casing, all wear being taken by the cone sleeves and the adjustable cups.

What I claim is:—

1. A roller bearing device, having a bearing containing casing, and a roller bearing contained therein, said bearing consisting of a double-cone member, a roller cage provided with end and center members and two sets of rollers journaled in said end and center members and bearing on the cone member, and a double cup member surrounding the rollers and forming the outer bearing therefor, said cone-member, roller cage, rollers, and cup-member being removable from the bearing casing as a unit; substantially as described.

2. A roller bearing device, having a bearing containing casing, and a roller bearing contained therein, said bearing consisting of a double-cone member, a roller cage provided with end and center members and two sets of rollers journaled in said end and center members and bearing on the cone member, and a double cup member surrounding the rollers and forming the outer bearing therefor, said cone-member roller cage, rollers, and cup-member being removable from the bearing casing as a unit, said cup-member being formed in two parts adjustably connected; substantially as described.

3. A roller bearing device, having an outer casing, a sleeve member formed with two oppositely inclined cone surfaces, a roller cage, two sets of oppositely inclined rollers journaled therein, and a cup member independent of the outer casing and removably fitting therein, said cup-member having oppositely inclined interior bearing surfaces; substantially as described.

4. A roller bearing device, having an outer casing, a sleeve member formed with two oppositely inclined cone surfaces, a roller cage, two sets of oppositely inclined rollers journaled therein, and a cup-member independent of the outer casing and removably fitting therein, said cup-member having oppositely inclined interior bearing surfaces, and formed in two sections longitudinally adjustable relatively to each other; substantially as described.

5. In a roller bearing device, a casing member having a bearing chamber at each end, a sleeve in each chamber having oppositely inclined cone-bearing surfaces, a roller cage surrounding each sleeve, two sets of oppositely inclined rollers journaled therein, and adjustable cup-members, said cup-members, roller cages, rollers, and sleeves being removable as a unit from their respective chambers; substantially as described.

6. In a roller bearing device, a casing member having a bearing chamber at each end, a sleeve in each chamber having oppositely inclined cone-bearing surfaces, a spacing member between the two sleeves, a roller cage surrounding each sleeve and two sets of oppositely inclined rollers journaled therein, and adjustable cup-members, said cup-members, roller cages, rollers and sleeves being removable as a unit from their respective chambers; substantially as described.

In testimony whereof, I have hereunto set my hand.

DAVID L. TSCHANTZ.

Witnesses:
NILES A. SPONSELLER,
F. W. BOND.